United States Patent [19]
Saitou

[11] Patent Number: 5,477,477
[45] Date of Patent: Dec. 19, 1995

[54] DATA SHIFTING CIRCUIT BY UTILIZING MOS BARREL SHIFTER

[75] Inventor: Akira Saitou, Itami, Japan

[73] Assignees: Mitsubishi Denki Kabushiki Kaisha; Mitsubishi Electric Engineering Company Limited, both of Tokyo, Japan

[21] Appl. No.: 265,874

[22] Filed: Jun. 27, 1994

[30] Foreign Application Priority Data

Jul. 2, 1993 [JP] Japan .................................... 5-164620

[51] Int. Cl.[6] ..................................................... G06F 7/00
[52] U.S. Cl. ........................................................ 364/715.08
[58] Field of Search ........................................ 364/715.08

[56] References Cited

U.S. PATENT DOCUMENTS 5,155,698 10/1992 Niimi ................................. 364/715.08

OTHER PUBLICATIONS

Mead et al., "Introduction to VLSI Systems", 1980, pp. 176–183.

Primary Examiner—Tan V. Mai
Attorney, Agent, or Firm—Lowe, Price, LeBlanc & Becker

[57] ABSTRACT

Data after shifting is outputted from a output bus 9 by that, n-bit, data inputted to a input bus 1 is connected either to a first bus 3 or to a second bus 4, or to the both of them by a bus switching circuit 2, data either on the first bus 3 or the second bus 4 which is not connected to the bus switching circuit 2 is compensated by data compensating circuits 51, 52, a signal including a shift quantity and shift direction given from a shift quantity bus 6 is decoded by a decoder 7, and by performing plural-bit shifting by a MOS transistor array 8 of n numbers of line and n+1 numbers of column. Respective processings of logical shift, arithmetic shift and rotation are performed in both right and left directions by a single circuit configuration.

7 Claims, 12 Drawing Sheets

|  | SA | SB | SC | SD | SE |
|---|---|---|---|---|---|
| (1) LEFT LOGICAL SHIFT | 1 | 0 | 0 | 0 | 1 |
| (2) LEFT ARITHMETIC SHIFT | 1 | 0 | 0 | 0 | 1 |
| (3) LEFT ROTATE | 1 | 1 | 0 | 0 | 0 |
| (4) RIGHT LOGICAL SHIFT | 0 | 1 | 0 | 1 | 0 |
| (5) RIGHT ARITHMETIC SHIFT | 0 | 1 | 1 | 0 | 0 |
| (6) RIGHT ROTATE | 1 | 1 | 0 | 0 | 0 |

|  | SA | SB | SC | SD |
|---|---|---|---|---|
| (1) LEFT LOGICAL SHIFT | 1 | 0 | 0 | 1 |
| (2) LEFT ARITHMETIC SHIFT | 1 | 0 | 0 | 1 |
| (3) LEFT ROTATE | 1 | 1 | 0 | 1 |
| (4) RIGHT LOGICAL SHIFT | 0 | 1 | 0 | 0 |
| (5) RIGHT ARITHMETIC SHIFT | 1 | 1 | 1 | 0 |
| (6) RIGHT ROTATE | 1 | 1 | 0 | 1 |

FIG. 7

| SHIFT QUANTITY | SELECTED SHIFT LINE AT LEFT SHIFT(ROTATE) | SELECTED SHIFT LINE AT RIGHT SHIFT(ROTATE) |
|---|---|---|
| 0 | 7a | 7e |
| 1 | 7b | 7d |
| 2 | 7c | 7c |
| 3 | 7d | 7b |

DATA SHIFTING CIRCUIT BY UTILIZING MOS BARREL SHIFTER

BACKGROUND OF THE INVENTION

1. Field of the Invention

The present invention relates to a data shifting circuit, and particularly to a data shifting circuit capable of realizing various shifting functions and rotating functions by utilizing a MOS barrel shifter.

2. Description of the Relates Art

Figure 1:
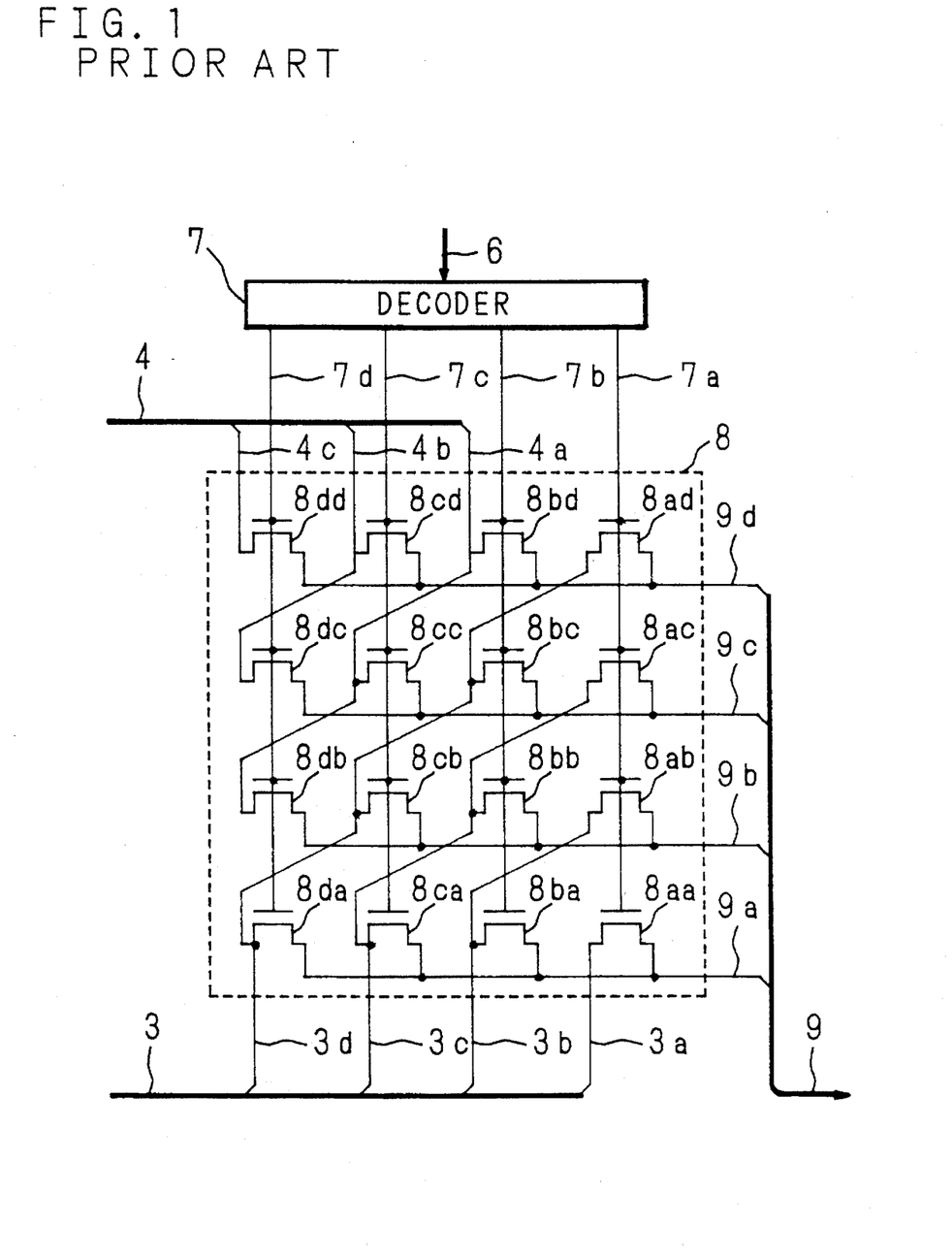
FIG. 1 is a block diagram showing an example of configuration of a data shifting circuit utilizing a conventional MOS barrel shifter.

FIG. 1 is a block diagram showing an example of conventional configuration of a date shifting circuit for processing 4-bit data by utilizing a MOS barrel shifter.

In FIG. 1, numeral 3 designates a first bus for inputting 4-bit data to be processed from the outside, respective bits are inputted to a MOS transistor array 8, to be described later, in order from tile higher bits respectively through bit lines 3a, 3b, 3c and 3d.

Numeral 4 designates a second bus for inputting an optional value for compensating the data, the bits, except the lowest bit, are inputted to the MOS transistor array 8, to be described later, in order from the higher bits respectively through bit lines 4a, 4b and 4c.

Numeral 6 designates a shift quantity bus to which a signal (shift quantity signal) indicating a shift, quantity is inputted. The shift quantity bus 6 is connected to a decoder 7. The decoder 7 signifies any of 0-bit shift line 7a, 1-bit shift line 7b, 2-bit shift line 7c and 3-bit shift line 7d corresponding to the shift quantity signal, by decoding the shift, quantity signal.

Numeral 9 designates an output bus for outputting the data to the outside from the MOS transistor array 8, respective bits are outputted in order from the higher bits from the MOS transistor array 8 through signal lines 9a, 9b, 9c and 9d.

The MOS transistor array 8 is constituted by 16 MOS transistors 8aa, 8ab, ... 8dc and 8dd. Specifically, the MOS transistor array 8 is arranged in a matrix of 4 rows×4 columns, wherein to drains of the MOS transistors 8aa, 8ba, 8ca and 8da arranged in the row direction, the bit line 9a of the output bus 9 is connected, to drains of the MOS transistors 8ab, 8bb, 8cb and 8db, the bit line 9b of the output bus 9 is connected, to drains of the MOS transistors 8ac, 8bc, 8cc and 8dc, the bit line 9c of the output bus 9 is connected, and to drains of the MOS transistors 8ad, 8bd, 8cd and 8dd, the bit line 9d of the output bus 9 is connected. To gates of the MOS transistors 8aa, 8ab, 8ac and 8dd arranged in the column direction, the shift line 7a is connected, to gates of the MOS transistors 8ba, 8bb, 8bc and 8bd, shift line 7b is connected, to gates of the MOS transistors 8ca, 8cb, 8cc and 8cd, the shift line 7c is connected, and to gates of the MOS transistors 8da, 8db, 8dc and 8dd, the shift line 7d is connected.

Furthermore, to sources of the MOS transistors in the MOS transistor array 8, the 4-bit lines 3a, 3b, 3c and 3d of the first bus 3 and the bit lines 4a, 4b and 4c, except the lowest bit 4d, of the second bus 4 are connected in a step-like fashion.

Specifically, the bit line 3a of the first bus 3 is connected to the source of the MOS transistor 8aa, the bit line 3b to the sources of the MOS transistors 8ba, 8ab, the bit line 3c to the sources of the MOS transistors 8ca, 8bb, 8ac, the bit line 3d to the sources of the MOS transistors 8da, 8cb, 8bc, 8ab, and the bit line 4a of the second bus 4 is connected to sources of the MOS transistor 8bd, 8cc, 8db, the bit line 4b to sources of the MOS transistors 8cd, 8dc, and the bit line 4c to a source of the MOS transistor 8dd.

Next, the operation of the conventional data shifting circuit utilizing the MOS barrel shifter shown in FIG. 1 is described.

For example, in case of 3-bit left shift of 4-bit data "1001", the data "1001" is inputted to the first bus 3 and all bits of the second bus 4 are set to "0". Also, a signal indicating a shift quantity "3" is given to the shift quantity bus 6, and decoded by the decoder 7 to select the shift line 7d for 3-bit shift.

Thereby, the MOS transistors 8da, 8db, 8dc and 8dd, to whose gates the shift line 7d in the MOS transistor array 8 is connected, are turned ON and the other MOS transistors are turned OFF, so that output; data "1000" is outputted from the output bus 9.

Next, the case of rotating the data is described.

Hereupon, the left n-bit rotation of m-bit data means to shift the data to the left by n bits, and to add higher n-bit data which has been overflown from the m bits being a data bit width, as the result of shifting the data to the left by n bits, and the m-bit data which has been shifted to the left by n bits.

For example, in case of 3-bit rotation of 4-bit data "1001", the data "1001" which is inputted to both the first bus 3 and the second bus 4. Also, the signal indicating the shift quantity "3" is given to the shift quantity bus 6 and decoded by the decoder 7 to select the shift lien 7d for 3-bit, shift.

Thereby, the MOS transistor 8da, 8db, 8dc, 8dd, to whose gates the shift line 7d is connected, in the MOS transistor array 8 are turned ON, and the other MOS transistors are turned OFF, so that output data "1100" is outputted from the output bus 9.

In the conventional data shifting circuit as described above, though the left shift or rotation is possible, for executing the right shift or rotation, another barrel shifter, in which connections of the first bus 3 and the second bus 4 of the barrel shifter shown in FIG. 1 are changed, is necessary.

And hence, in case of providing the both barrel shifters in a 1-chip microcomputer and the like, a circuit configuration becomes complicated and the number of MOS transistors increases to occupy a large area on the chip.

SUMMARY OF THE INVENTION

The present invention has been devised to solve the above-mentioned problems, therefore, it is an object thereof to obtain a shifting circuit capable of various shifting processings and rotating processings without increasing the occupied area on a chip, in case of constituting a barrel shifter on an integrated circuit of a 1-chip microcomputer and the like.

A data shifting circuit according to the present invention comprises: an input bus through which n-bit data to be processed is inputted from the outside, a bus switching circuit which connects the input bus to either a first bus or a second bus or to the both buses responsive to the processing; data compensating circuits for compensating the data on the first and second buses responsive to the processing; a decoder which decodes a signal indicating a shift quantity and direction to signify a corresponding control signal line and to produce a control signal of the data compensating circuits; an output, bus which ouputs the processed data to the outside; and a MOS transistor array in which all bit lines of the first bus and all bit lines of the second bus are connected, in a steep-like fashion, to sources of the MOS transistors, corresponding bit lines of the output bus are commonly connected to sources of n+1 numbers of MOS transistor in respective lines, and corresponding control signal lines of the decoder are commonly connected to gates of n numbers of MOS transistor in respective columns.

The abovementioned data compensating circuits include a compensating function for expanding all data bits on the first, and second buses to "0", or to a same value as a highest bit of the input bus.

In the data shifting circuit according to the present invention, the shift quantity and direction are switched responsive to the kind of shifting processing, and by adjusting a bit position of the output data or combinations thereof, right and left logical shifts, right and left arithmetic shifts and right and left rotations of the data to be processed are possible.

The above and further objects and features of the invention will more fully be apparent from the following detailed description with accompanying drawings.

DESCRIPTION OF THE PREFERRED EMBODIMENTS

In the following, one embodiment of the present invention is particularly described referring to the drawings showing its embodiments.

Figure 2:
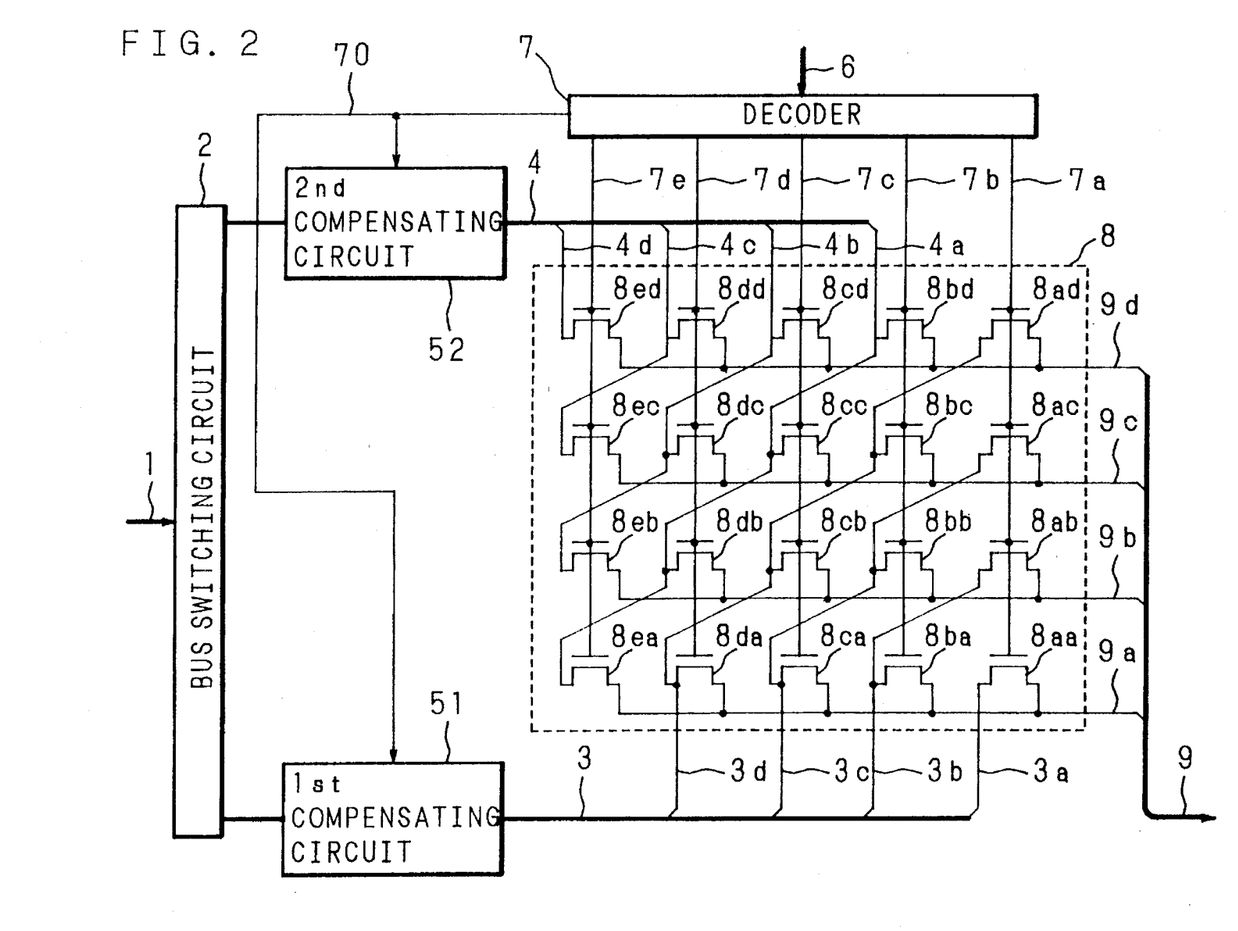
FIG. 2 is a block diagram showing an example of configuration of an embodiment of a data shifting circuit utilizing a MOS barrel shifter of the present invention.

FIG. 2 is a block diagram showing an example of a configuration of the data shifting circuit of the present invention for processing 3-bit data.

In FIG. 2, the same reference characters as FIG. 1 referred to in describing the aforementioned conventional example designate the same or corresponding parts.

In FIG. 2, numeral 1 designates an input bus for inputting 4-bit data to be processed from the outside.

Numeral 2 designates a bus switching circuit for switching the input bus 1 to either a first bus 3 or a second bus 4, to be described later, or to the both for connection.

Numeral 3 designates, as stated above, the first bus which connects the bus switching circuit 2 and a MOS transistor array 8 to be described later. The first bus 3 is of 4 bits which are inputted to the MOS transistor array 8, to be described later, in order from the higher bits through bit lines 3a, 3b, 3c and 3d.

Numeral 4 designates, as stated above, the second bus which inputs data from the bus switching circuit, 2. The second bus 4 is of 4 bits which are inputted to the MOS transistor array 8, to be described later, in order from the higher bits through bit lines 4a, 4b, 4c and 4d.

Numeral 51 designates a first data compensating circuit which expands all bits of the first bus 3 to "0" or to a same value as a highest bit of the input bus 1, and numeral 52 designates a second data compensating circuit which expands all bits of the second bus 4 to "0" or to the same value as the highest bit of the input bus 1.

Numeral 6 designates a shift quantity bus through which signals indicating a shift quantity and shift direction are inputted. The shift quantity bus 6 is connected to a decoder 7. The decoder 7 signifies any of the shift, lines 7a, 7b, 7c 7d and 7e which correspond to the shift quantity and shift direction, by decoding the inputted signal.

The decoder 7 produces signals 70 for controlling the bus switching circuit 2 and the data compensating circuits 51, 52 as to be described later.

Numeral 9 designates an output bus for outputting data to the outside from the MOS transistor array 8, and respective bits are outputted from the MOS transistor array 8 in order from the higher bits through the signal lines 9a, 9b, 9c and 9d.

The MOS transistor array 8 is composed of 20 MOS transistors 8aa, 8ab, ... 8ec and 8ed. Specifically, the MOS transistor array 8 is arranged in a matrix of 4 rows×5 columns, wherein to drains of the MOS transistors 8aa, 8ba, 8ca, 8da and 8ea arranged in the row direction, the bit line 9a of the output bus 9 is connected, to drains of the MOS transistors 8ab, 8bb, 8cb, 8db and 8eb, the bit line 9b of the output bus 9 is connected, to drains of the MOS transistors 8ac, 8bc, 8cc, 8dc and 8ec, the bit line 9c of the output bus 9 is connected, and to drains of the MOS transistors 8ad, 8bd, 8cd, 8dd and 8ed, the bit line 9d of the output bus 9 is connected, and to gates of the MOS transistors 8aa, 8ab, 8accand 8ad arranged in the row direction, the shift line 7a is connected, to gates of the MOS transistors 8ba, 8bb, 8bc and 8bd, the shift line 7b is connected, to gates of the MOS transistors 8ca, 8cb, 8cc and 8cd, the shift line 7c is connected, to gates of the MOS transistors 8da, 8db, 8dc and 8dd, the shift line 7d is connected, and to gates of the MOS transistors 8ea, 8eb, 8ec and 8ed, the shift line 7e is connected.

Furthermore, to the MOS transistor sources of the MOS transistor array 8, all bit lines 3a, 3b, 3c, 3d of the first bus 3 and all bit lines 4a, 4b, 4c, 4d of the second bus 4 are connected in a step-like fashion.

Specifically, the bit line 3a of the first bus 3 is connected to the source of the MOS transistor 8aa, the bit line 3b to the sources of the MOS transistors 8ba, 8ab, the bit line 3c to the sources of the MOS transistors 8ca, 8bb, 8ac and bit line 3d to the sources of the MOS transistors 8da, 8cb, 8bc, 8ab, and the bit line 4a of the second bus 4 is connected to the sources of the MOS transistors 8bd, 8cc, 8db, 8ea, the bit line 4b to the sources of the MOS transistors 8cd, 8dc, 8eb, the bit line 4c to the sources of the MOS transistors 8dd, 8ec and bit line 4d to the source of the MOS transistor 8ed.

Figure 3:
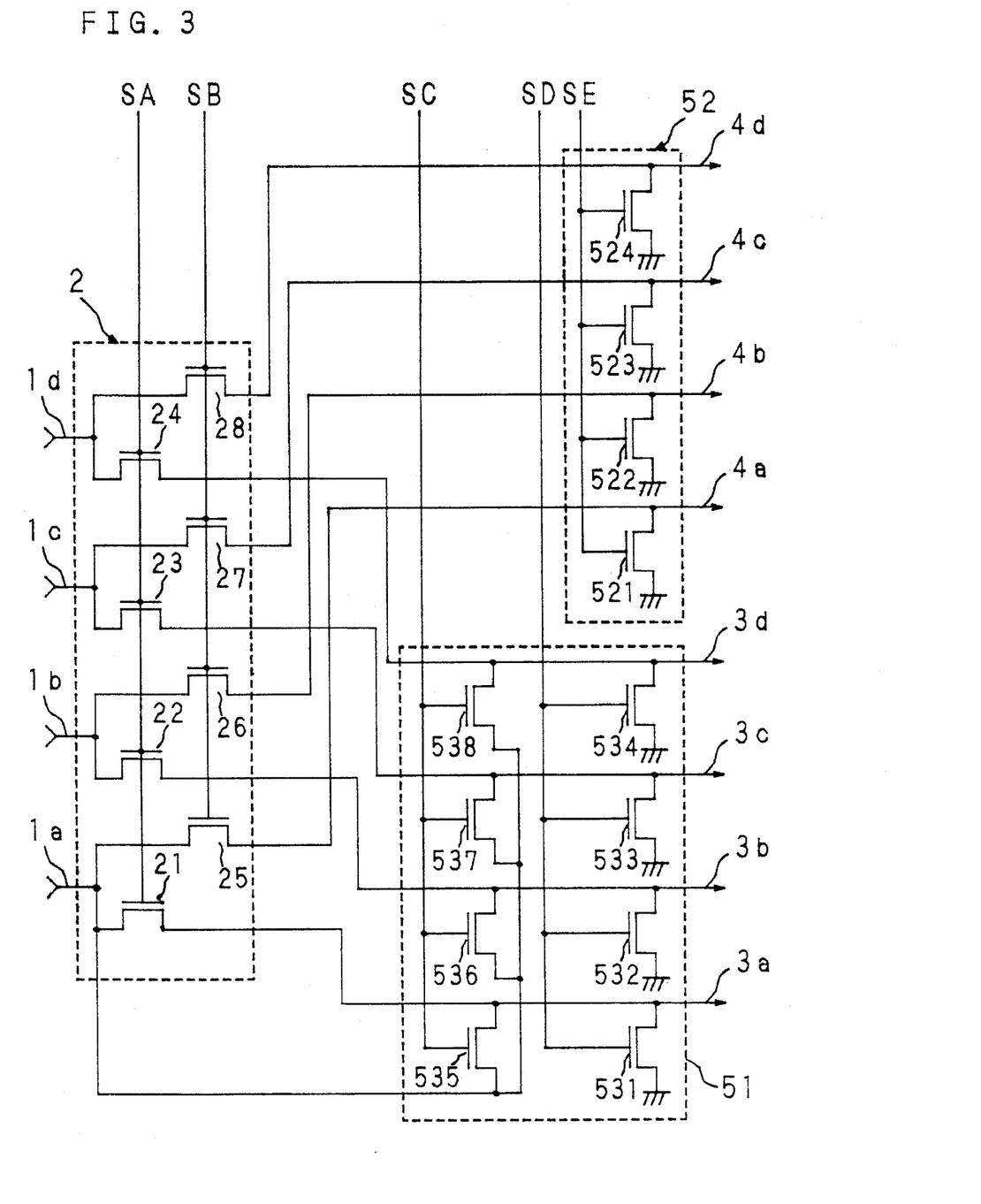
FIG. 3 is a circuit diagram showing a first example of configuration of a bus switching circuit and data compensating circuits of a data shifting circuit of the present invention.
Figure 4:
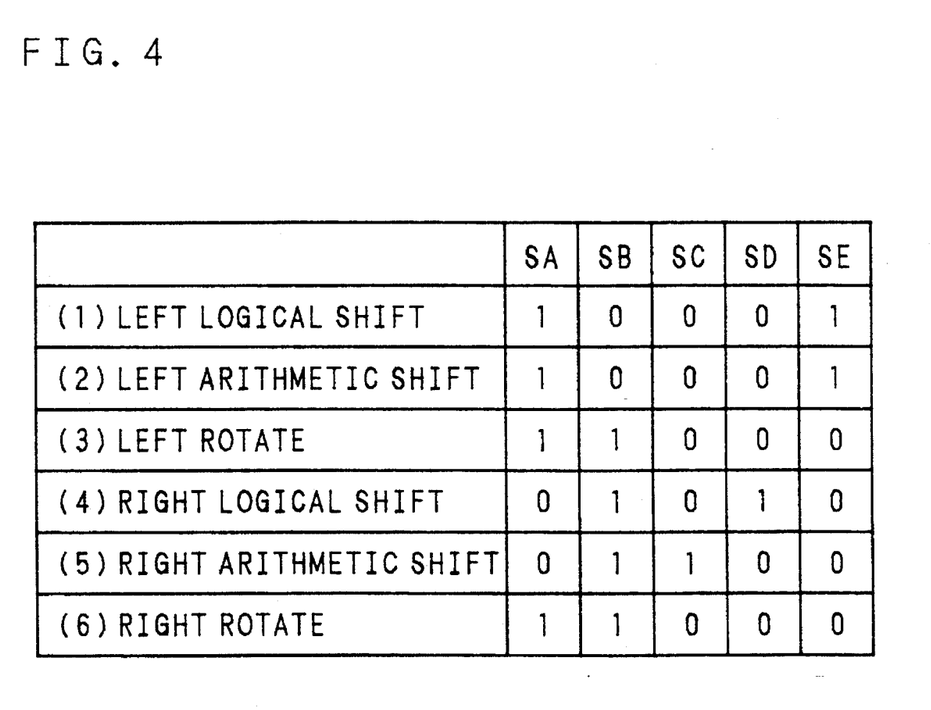
FIG. 4 is a truth table of a circuit shown in FIG. 3.

FIG. 3 is a circuit diagram showing an example of configuration of a bus switching circuit 2 and data compensating circuits 51, 52 of a data shifting circuit of the present invention, and FIG. 4 is a truth table showing a relationship between input/output signals of the signal and control signals 70 (SA, SB, SC, SD, SE) given from the decoder 7.

Respective bits of the input bus 1 are inputted to the bus switching circuit 2 via bit lines 1a, 1b, 1c and 1d.

The bit line 1a is connected to a source of a MOS transistor 521 of the second data compensating circuit 52 via a MOS transistor 25 of the bus switching circuit 2, and serves as the bit line 4a of the seco d bus 4. The bit line 1a is also connected to a drain of the MOS transistors 535 and a source of the MOS transistor 531 of the first data compensating circuit 51 via a MOS transistor 21 of the bus switching circuit 2, and serves as the bit line 3a of the first bus 3.

In addition, a source of the MOS transistor 535 is connected to the bit line 1a.

The bit line 1b is connected to a source of a MOS transistor 522 of the second data compensating circuit 52 via a MOS transistor 26 of the bus switching circuit 2, and serves as the bit line 4b of the second bus 4. The bit line 1b is also connected to a drain of the MOS transistor 536 and a source of a MOS transistor 532 of the first data compensating circuit 51 via a MOS transistor 22 of the bus switching circuit 2, and serves as the bit line 3b of the first bus 3.

In addition, a source of the MOS transistor 536 is connected to the bit line 1a.

The bit line 1c is connected to a source of a MOS transistor 523 of the second data compensating circuit 52 via a MOS transistor 27 of the bus switching circuit 2, and serves as the bit line 4c of the second bus 4. The bit line 1c is also connected to a drain of a MOS transistor 537 and a source of a MOS transistor 533 of the first data compensating circuit 51 via a MOS transistor 23 of the bus switching circuit 2, and serves as the bit line 3c of the first bus 3.

In addition, a source of the MOS transistor 537 is connected to the bit line 1a.

The bit line 1d is connected to a source of a MOS transistor 524 of the second data compensating circuit 52 via a MOS transistor 28 of the bus switching circuit 2, and serves as the bit line 4d of the second bus 4. The bit line 1d is also connected to a drain of a MOS transistor 538 and a source of a MOS transistor 534 of the first data compensating circuit 51 via a MOS transistor 24 of the bus switching circuit 2, and serves as the bit line 3d of the first bus 3.

In addition, a source of the MOS transistor 538 is connected to the bit line 1a.

Drains of the MOS transistors 521, 522, 523 and 524 of the second data compensating circuit 52 are grounded. Also, drains of the MOS transistors 531, 532, 533 and 534 of the first data compensating circuit 41 are grounded.

The MOS transistors 21, 22, 23 and 24 of the bus switching circuit 2 are turned ON and OFF by a signal SA, and the MOS transistor 25, 26, 27 and 28 are turned ON and OFF by a signal SB. Thus, in the bus switching circuit 2, as is shown in a truth table of FIG. 4, when only the signal SA is "1", data of the bit lines 1a, 1b, 1c and 1d of the input bus 1 are outputted to the first data compensating circuit 51 intact, and when only the signal SB is "1", the data of the bit lines 1a, 1b, 1c and 1d of the input bus 1 are outputted to the second data compensating circuit 52 intact.

The MOS transistors 535, 536, 537 and 518 of the first data compensating circuit 51 are turned ON and OFF by a signal SC, and the MOS transistors 531, 532, 533 and 534 are turned ON and OFF by a signal SD. Thus, in the first data compensating circuit 51, as is shown in the truth table of FIG. 4, when only the signal SD is "1", the bit lines 3a, 3b, 3c and 3d of the first bus 3 are all grounded and data become "0", and when only the signal SC is "1", highest bit data of the input bus 1 is outputted to the highest bit line 3a of the first bus 3 from the bit line 1a through the MOS transistor 535, and also outputted to the other bit lines 3b, 3c and 3d of the first bus 3 via the MOS transistors 536, 537 and 538.

The MOS transistors 521, 522, 523 and 524 of the second data compensating circuit, 52 are turned ON and OFF by a signal SE. Thus, in the second data compensating circuit 52, as is shown in the truth table of FIG. 4, when the signal SE is "1", the bit lines 4a, 4b, 4c and 4d of the second bus 4 are all grounded and the data become "0".

The truth table of FIG. 4 is described in the following.

In the circuit shown in FIG. 3, functions of the signals SA to SE are as follows in short. When the signal SA is "1", data on the input bus 1 is outputted to the first bus 3. When the signal SB is "1", the data on the input bus 1 is outputted to the second bus 4. When the signal SC is "1" and the signal SA is "0", data obtained by expanding the highest data bit on the input bus 1 to the other bits is outputted to the first bus 3. When the signal SD is "1", all data on the first bus 3 become "0". When the signal SE is "1", all data on the second bus 4 become "0".

In case of left logical shift (1), the signals SA and SE become "1". In this case, the bus switching circuit 2 outputs the input data, which is inputted to the input bus 1, intact to the first bus 3 from the first data compensating circuit 51, and the second data compensating circuit 52 makes all bits of the second bus 4 "0".

In case of left arithmetic shift (2), it is same as the case of left logical shift (1).

In case of left rotation (3), the signals SA and SB become "1". In this case, the bus switching circuit 2 outputs the input data, which is inputted to the input bus 1, intact to the first bus 3 from the first data compensating circuit 51, and to the second bus 4 from the second data compensating circuit 52.

In case of right logical shift (4), the signals SB and SD become "1". In this case, the bus switching circuit 2 outputs the input data, which is inputted to the input bus 1, intact to the second bus 4 from the second data compensating circuit 52, and the first data compensating circuit 51 makes all bits of the first, bus 3 "0".

In case of right arithmetic shift (5), the signals SB and SC become "1". In this case, the bus switching circuit 2 outputs the input data, which is inputted to the input bus 1, intact to the second bus 4 from the second data compensating circuit 52. And in the first data compensating circuit 51, the highest bit of the input bus 1 is expanded to the other bits and output ted to the first bus 3.

In case of right rotation (6), it is same as the aforementioned case of left rotation (3).

Figure 5:
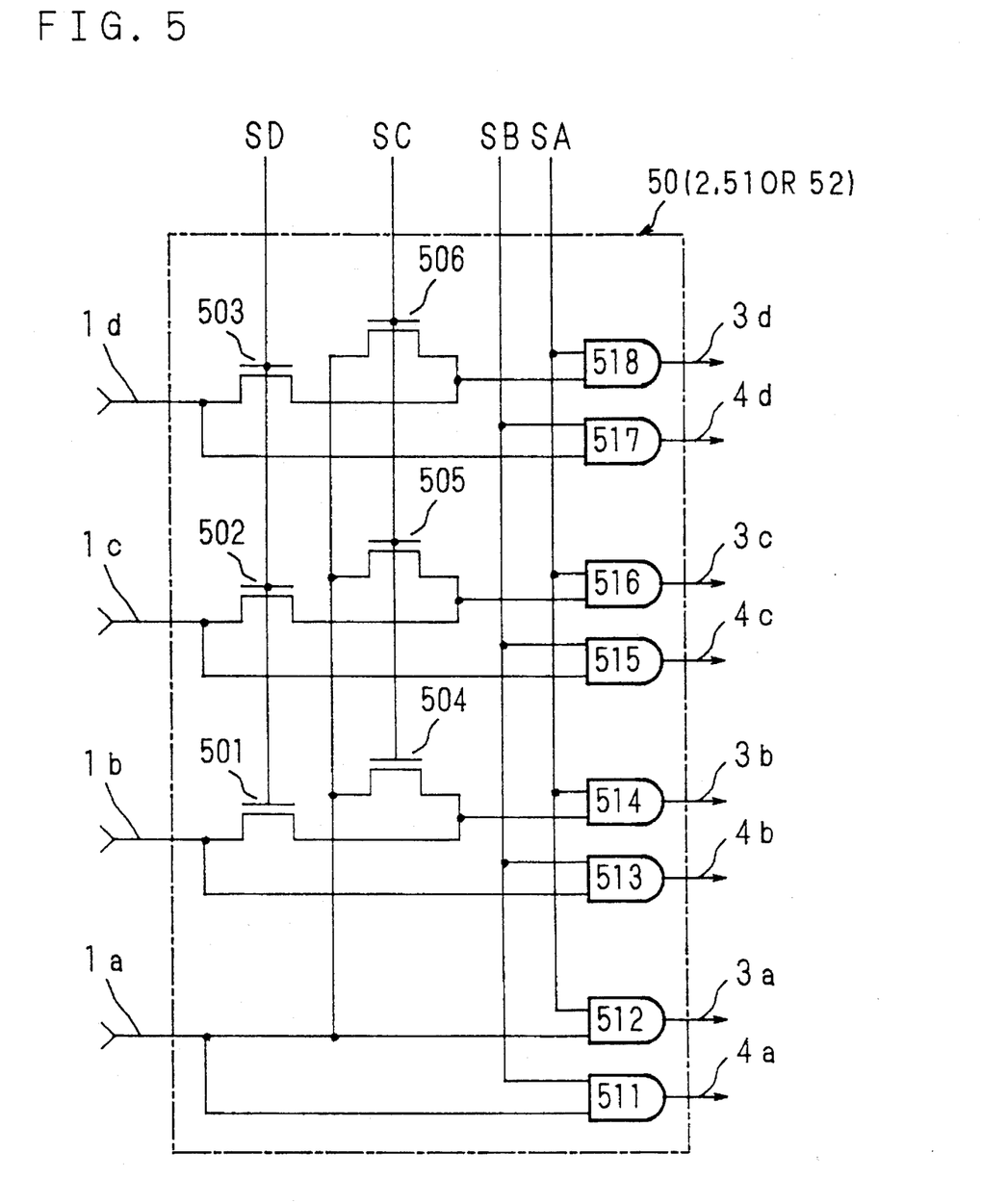
FIG. 5 is a circuit diagram showing a second example of configuration of a bus switching circuit and a data compensating circuit of a data shifting circuit of the present invention.
Figure 6:
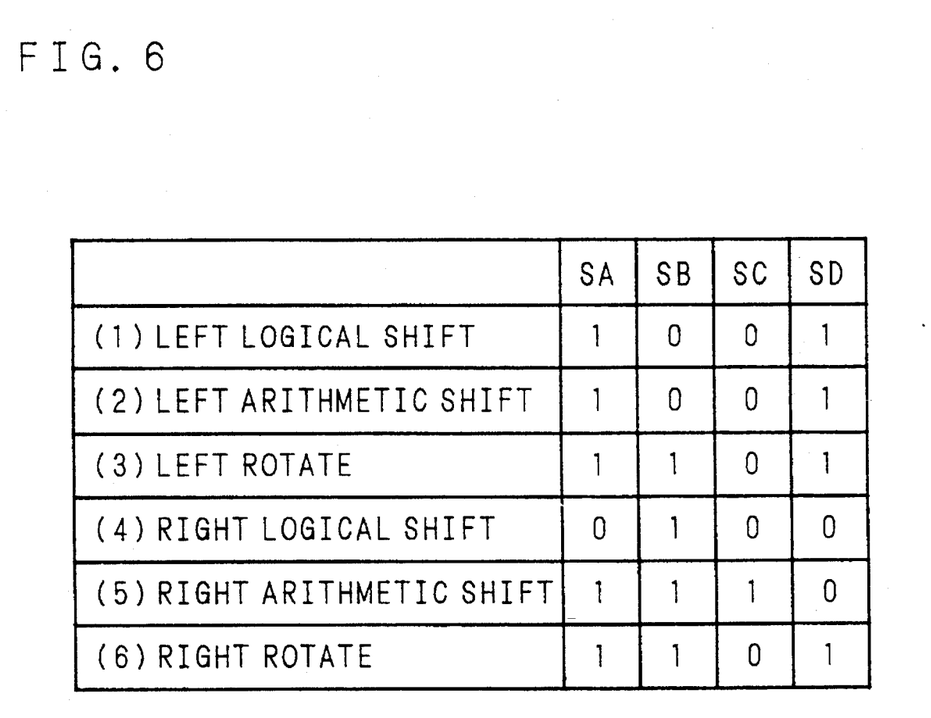
FIG. 6 is a truth table of a circuit shown in FIG. 5.

FIG. 5 is a circuit diagram showing an example of another configuration of a bus switching circuit 2 and data compensating circuits 51, 52 of a data shifting circuit of the present invention, and FIG. 6 is a truth table showing a relationship between input/output signals of the signal and control signals 70 (SA, SB, SC, SD) given from the decoder 7.

Hereupon, since the bus switching circuit 2 and the data compensating circuits 51, 52 are constituted as an integrated circuit, the description is made in the following as a bus switching/data compensating circuit 50.

In FIG. 5, numerals 501 to 506 designate MOS transistors, and numerals 511 to 518 designates 2-input AND gates.

Respective bits of the input bus 1 are inputted to the bus switching/data compensating circuit 50 via bit lines 1a, 1b, 1c and 1d.

The bit line 1a is inputted to one input terminals of the AND gates 511 and 512, arid connected to sources of the MOS transistors 504, 505 and 506.

The bit line 1b is inputted to one input terminal of the AND gate 513, and inputted to one input terminal of the AND gate 514 via the MOS transistor 501.

The bit line 1c is inputted to one input terminal of the AND gate 515, and inputted to one input terminal of the AND gate 516 via the MOS transistor 502.

The bit, line 1d is inputted to one input terminal of the AND gate 517, and inputted to one input terminal of the AND gate 518 via the MOS transistor 503.

Drains of the MOS transistors 504, 505 and 506 are connected to one input terminals of the AND gates 514, 516 and 518.

The signal SA is inputted to another input terminals of the AND gates 512, 514, 516 and 518. The signal SB is inputted to another input terminals of the AND gates 511, 513, 515 and 517.

An output of the AND gate 511 serves as the bit line 4a of the second bus 4, an output of the AND gate 512 as the bit line 3a of the first bus 3, an output of the AND gate 513 as the bit line 4b of the second bus 4, an output of the AND gate 514 as the bit, line 3b of the first bus 3, an output of the AND gate 515 as the bit line 4c of the second bus 4, an output of the AND gate 516 as the bit line 3c of the first bus 3, an output of the AND gate 517 as the bit line 4d of the second bus 4, and an output of the AND gate 518 as the bit line 3d of the first bus 3.

The MOS transistors 501, 502 and 503 are turned ON and OFF by the signal SD. Thus, when the signal SD is "1" and the signal SA is "1", the data on the input bus 1 is outputted to the first bus 3 intact.

When the signal SB is "1", the data on the input bus 1 is outputted to the second bus 4 intact.

The MOS transistors 504, 505 and 506 are turned ON and OFF by the signal SC. Thus, when the signal SA is "1" and the signal SC is "1", data obtained by expanding the highest bit data on the input bus 1 to all other bits is outputted to the first bus 3.

The truth table shown in FIG. 6 is described in the following.

In FIG. 5, functions of the signals SA to SD are as follows in short. When the signal SA is "1", the data on the input bus 1 is outputted to the first bus 3. When the signal SB is "1", the data on the input bus 1 is outputted to the second bus 4. When the signal SC is "1" and both the signals SA and SD are "1", data obtained by expanding the highest data bit on the input bus 1 to the other bits is outputted to the first bus 3.

In case of left logical shift (1), the signals SA and SD become "1". In this case, the bus switching/data compensating circuit 50 outputs the input data, which is inputted to the input bus 1, intact to the first bus 3, and makes all bits of the second bus 4 "0".

In case of left arithmetic shift (2), it is same as the case of left logical shift (1).

In case of left rotation (3), tile signals SA, SB and SD become "1". In this case, the bus switching/data compensating circuit, 50 outputs the input data, which is inputted to the input bus 1, intact to the first bus 3 and second bus 4.

In case of right logical shift (4), the signal SB becomes "1". In this case, the bus switching/data compensating circuit 50 outputs the input data, which is inputted to the input bus 1, intact to the second bus 4, and makes all bits of the first: bus 3 "0".

In case of right arithmetic shift (5), the signals SA, SB and SC become "1". In this case, the bus switching/data compensating circuit 50 outputs the input data, which is inputted to the input bus 1, intact to the first bus 3 and second bus 4. However, since the signal SC is "1", the highest bit of the input bus 1 is expanded to the other bits and outputted to the first bus 3.

In case of right rotation (6), it is same as the case of left rotation (3).

Figure 7:
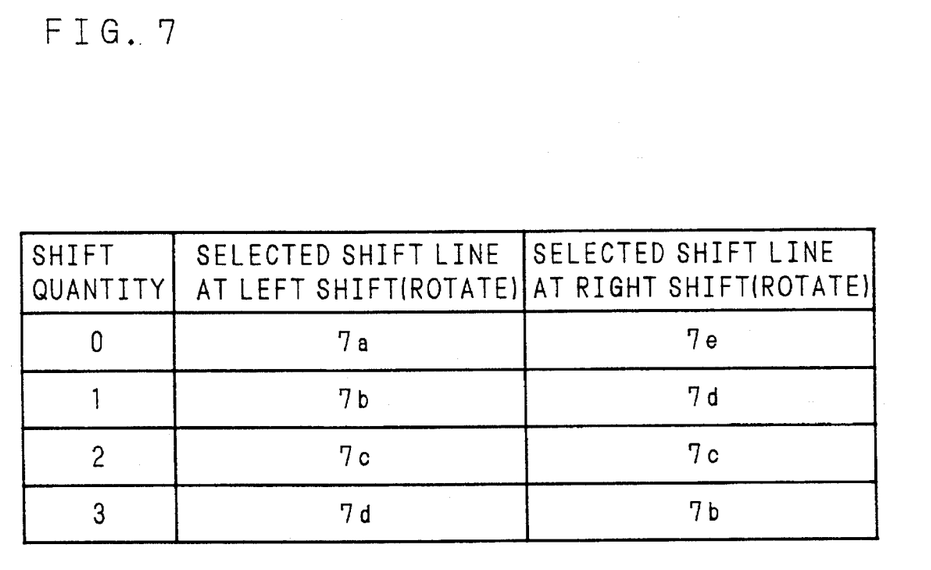
FIG. 7 is a table showing a relationship between an input/output and an output signal of a decoder of a MOS 4-bit data shifting circuit according to one embodiment of the present invention.

Next, the operation of the data shifting circuit of the present invention constituted as mentioned above is described in the following. Shift lines selected by the decoder 7 at the time of shifting and rotating processings to be described hereinbelow are as shown in FIG. 7.

Figure 8:
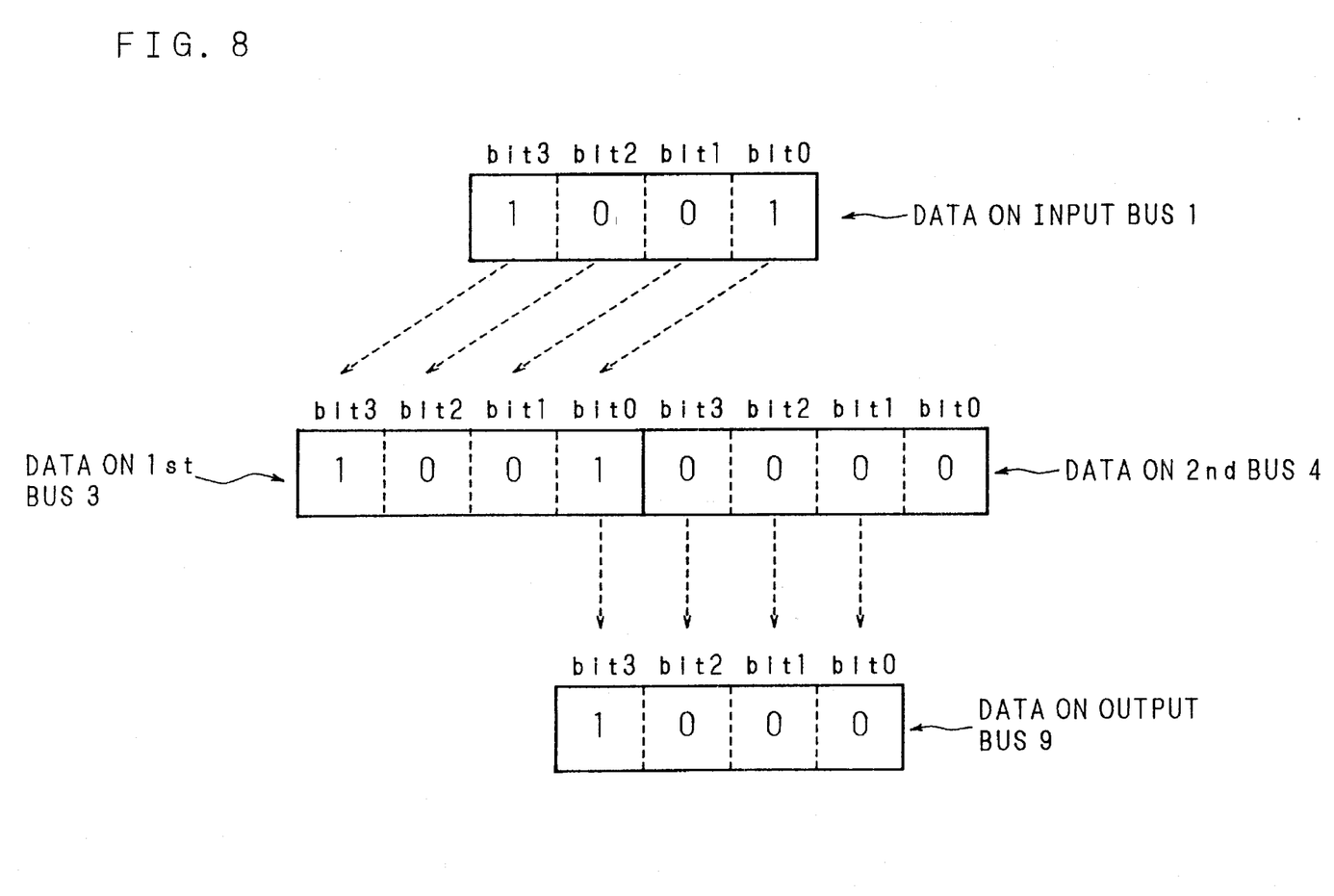
FIG. 8 is a schematic view showing the states of data at the time of left 3-bit logical shift or left, 3-bit arithmetic shift, according to one embodiment of a data shifting circuit of the present invention.

At first, in a schematic view of FIG. 8, the states of data at the time of left 3-bit logical shift or left 3-bit arithmetic shift when the data "1001" is inputted are shown.

In this case, the bus switching circuit 2 connects the input bus 1 to the first bus 3, and the second data compensating circuit 52 sets data on the second bus 4 to "0000". Thus, the input data to the first bus 3 becomes "1001", and the data on the second bus 4 becomes "0000". A signal indicating a shift quantity "3" is given to the shift quantity bus 6 and decoded by the decoder 7 to select the shift line 7d.

Thereby, since the MOS transistors 8da, 8db, 8dc and 8dd, to whose gates the shift line 7d in the MOS transistor array 8 is connected, are turned ON and the other MOS transistors are turned OFF, output data "1000" is outputted to the output bus 9.

Figure 9:
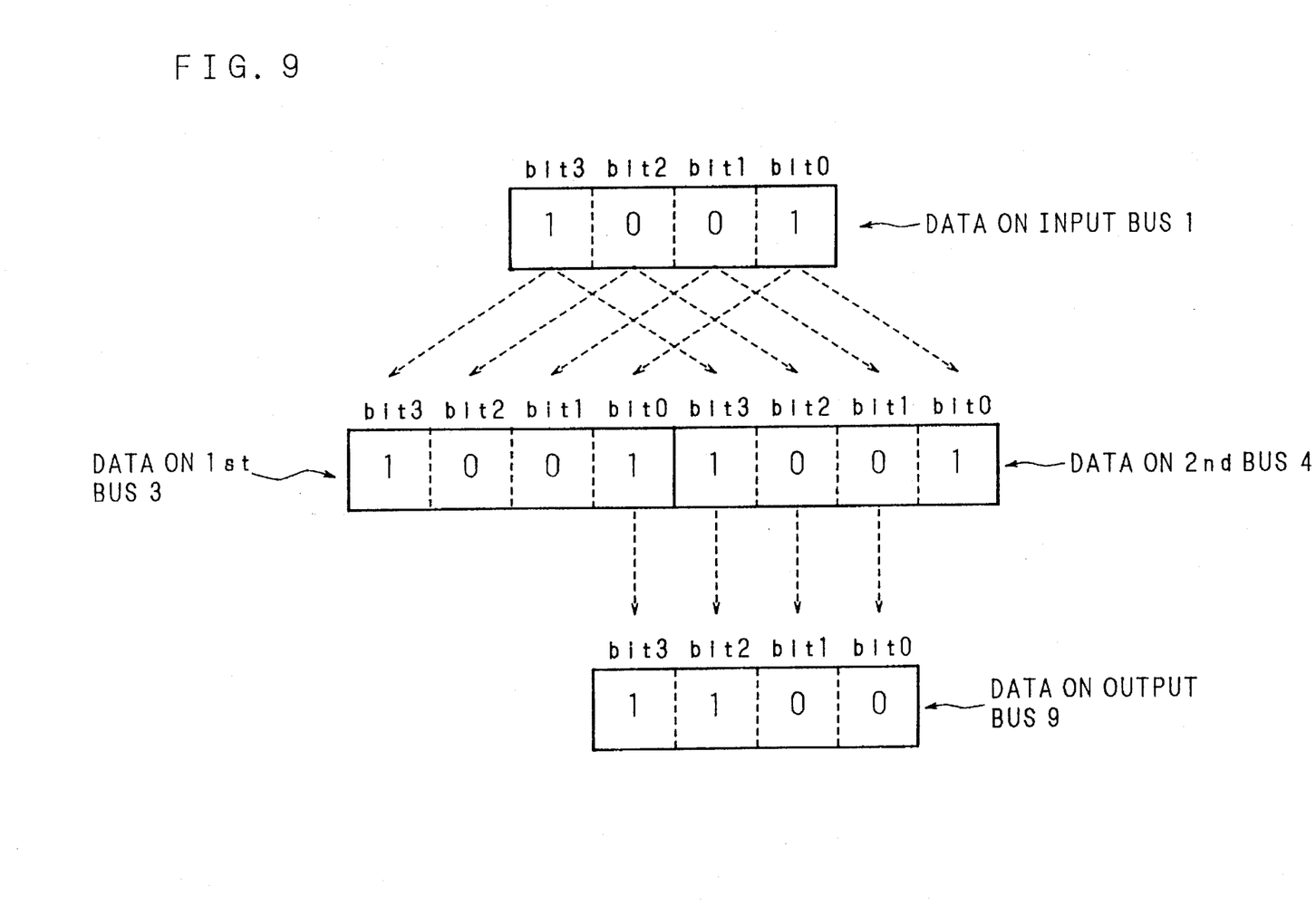
FIG. 9 is a schematic view showing the states of data at the time of left 3-bit rotation, according to one embodiment of a data shifting circuit of the present invention.

Next, in a schematic view of FIG. 9, the states of data at the time of left 3-bit rotation when the data "1001" is inputted are shown.

In this case, since the bus switching circuit 2 connects the input bus 1 to both the first bus 3 and the second bus 4, data on the first bus 3 and the second bus 4 become "1001". The signal indicating the shift quantity "3" is given to the shift quantity bus 6 and decoded by the decoder 7 to select the shift line 7d.

Thereby, since the MOS transistors 8da, 8db, 8dc and 8dd, to whose gates the shift line 7d in the MOS transistor array 8 is connected, are turned ON and the other MOS transistors are turned OFF, output data "1100" is outputted to the output bus 9.

Figure 10:
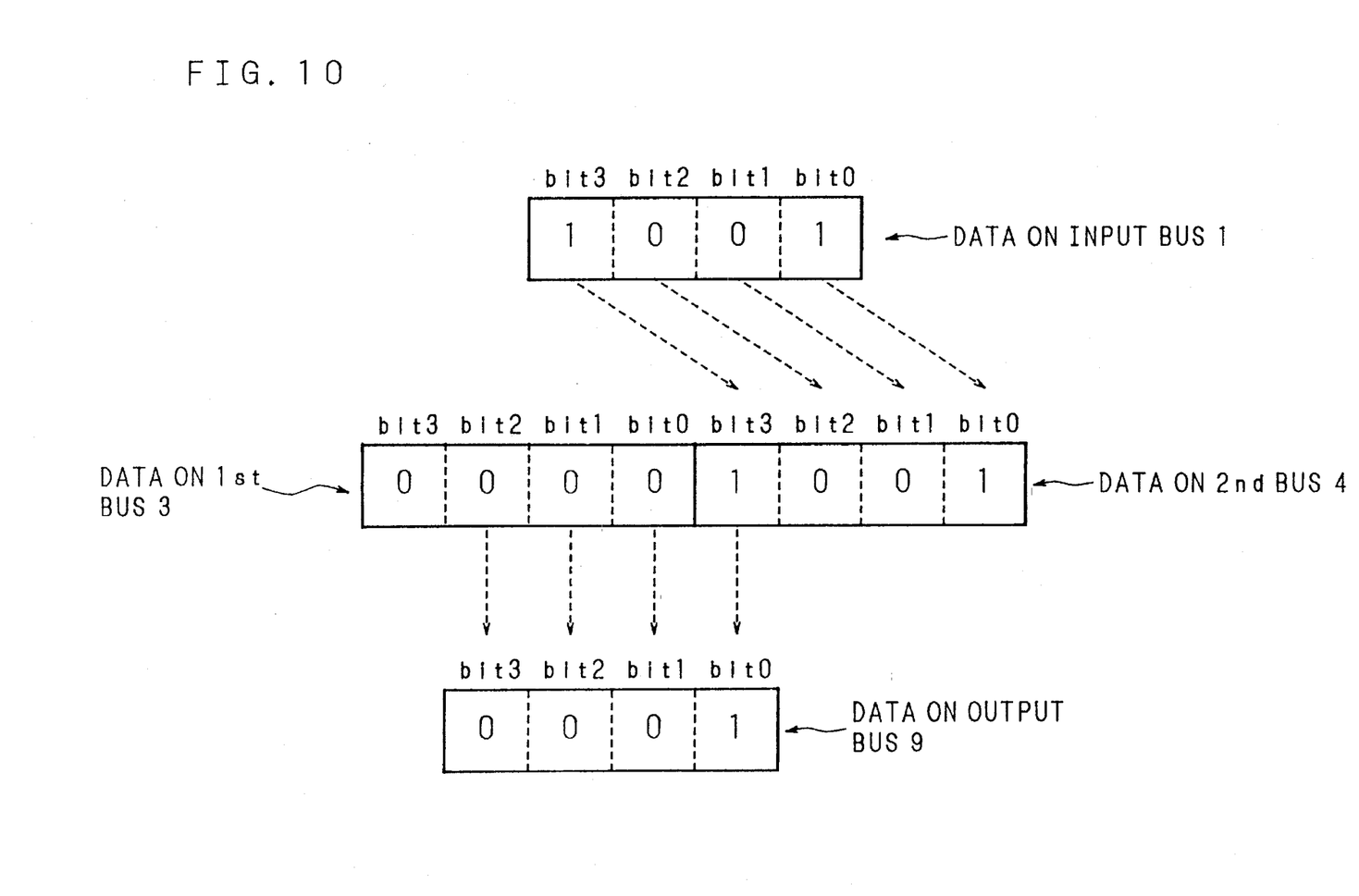
FIG. 10 is a schematic view showing the states of data at the time of right 3-bit logical shift, according to one embodiment of a data shifting circuit of the present invention.

In a schematic view of FIG. 10, the states of data at the time of right 3-bit logical shift when the data "1001" is inputted are shown.

In this case, the bus switching circuit 2 connects the input bus 1 to the second bus 4, and the first data compensating circuit, 51 sets the data on the first bus 3 to "0000". Thus, the data on the second bus 4 becomes "1001" and the data on the first bus 3 becomes "0000". The signal indicating the shift quantity "3" is given to the shift quantity bus 6 and decoded by the decoder 7 to select the shift line 7b.

Thereby, since the MOS transistors 8ba, 8bb, 8bc and 8bd, to whose gates the shift line 7b in the MOS transistor array 8 is connected, are turned ON and the other MOS transistors are turned OFF, output data "0001" is outputted to the output bus 9.

Figure 11:
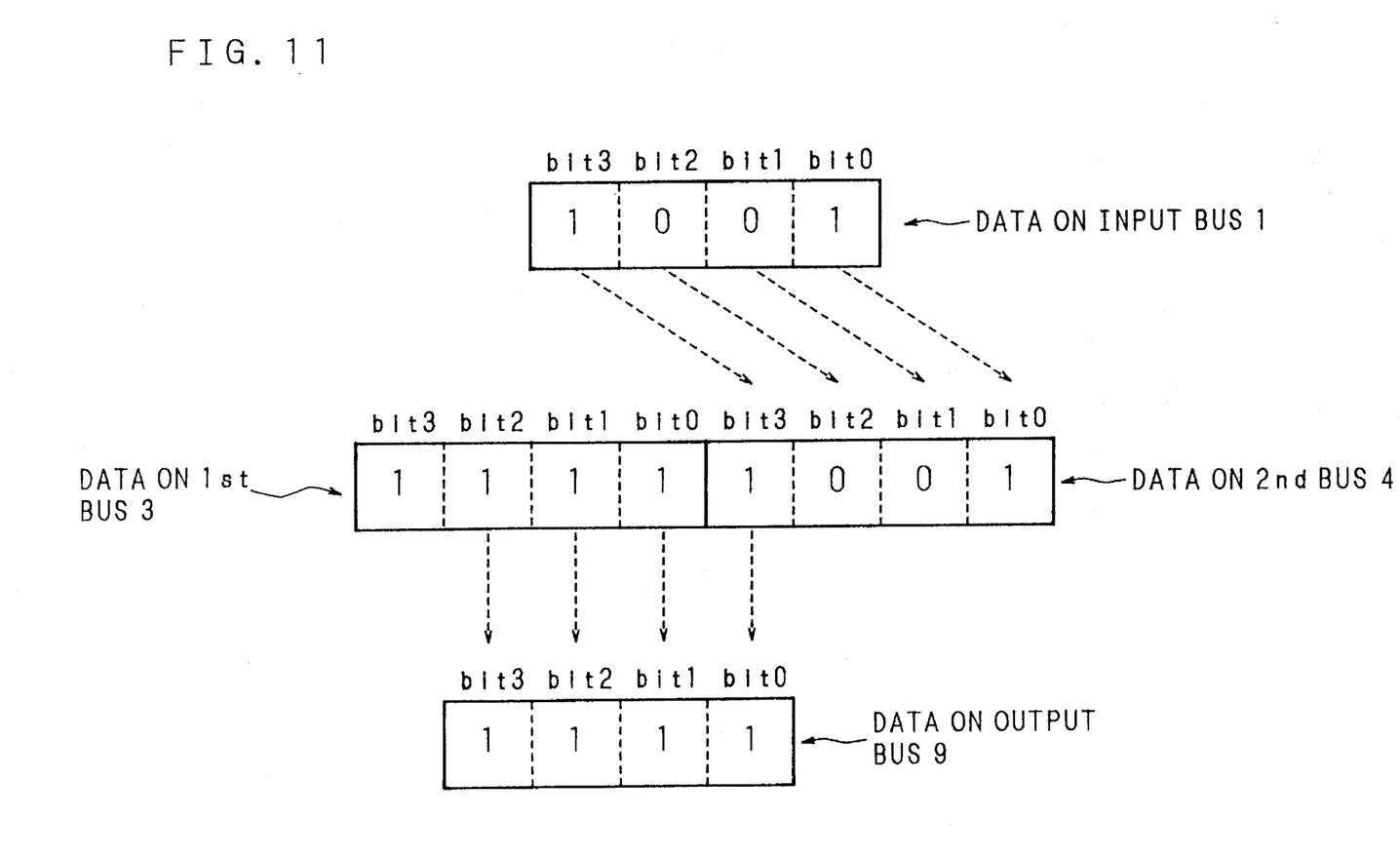
FIG. 11 is a schematic view showing the states of data at the time of right 3-bit arithmetic shift, according to one embodiment of a data shifting circuit of the present invention.

A schematic view of FIG. 11 shows the states of data at the time of right 3-bit arithmetic shift when the data "1001" is inputted.

In this case, the bus switching circuit 2 connects the input bus 1 to the second bus 4, and the second data compensating circuit 52 expands a value "1" of the highest bit of the input bus 1 to set the data on the first bus 3 to "1111". Thus, the data on the second bus 4 becomes "1001" and the data on the first bus 3 becomes "1111". The signal indicating the shift quantity "3" is given to the shift quantity bus 6 and decoded by the decoder 7 to select the shift, line 7b.

Thereby, since the MOS transistors 8ba, 8bb, 8bc and 8bd, to whose gates the shift line 7b in the MOS transistor array 8 is connected, are turned ON, and the other MOS transistors are turned OFF, the output data "1111" is outputted to the output bus 9.

Figure 12:
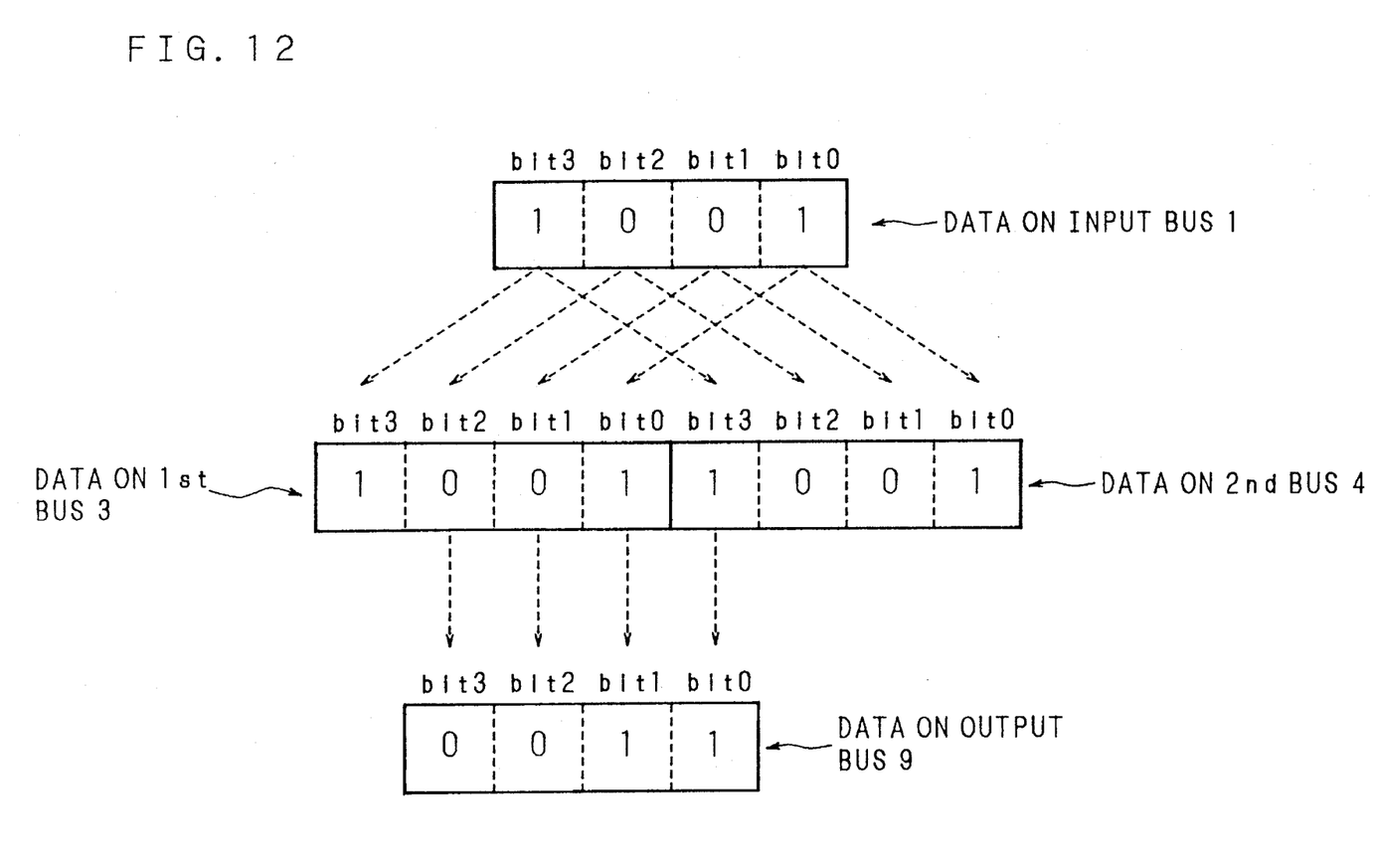
FIG. 12 is a schematic view showing the states of data at the time of right 3-bit rotation, according to one embodiment of a data shifting circuit of the present invention.

A schematic view of FIG. 12 shows the states of data at the time of right 3-bit rotation when the data "1001" is inputted.

In this case, since the bus switching circuit 2 connects the input bus 1 to both the first bus 3 and the second bus 4, the data on the first bus 3 and second bus 4 become "1001". The signal indicating the shift quantity "3" is given to the shift quantity bus 6 and decoded by the decoder 7 to select the shift line 7b.

Thereby, since the MOS transistors 8ba, 8bb, 8bc and 8bd, to whose gates the shift line 7b in the MOS transistor array 8 is connected, are turned ON and the other MOS transistors are turned OFF, output data "0011" is outputted to the output bus 9.

According to the present invention, as mentioned above, since the left logical shift, left arithmetic shift, left rotation, right logical shift, right arithmetic shift and right rotation can be processed by a single circuit configuration, the number of MOS transistors can be reduced. Thus, in case of incorporating a barrel shifter, for example, in a 1-chip microcomputer and the like, an occupied area on the chip can be minimized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data shifting circuit for shifting n-bit data by a MOS transistor array comprising:

an input bus for inputting the n-bit data to be processed;

a first bus for inputting the data to be processed, which is inputted from said input bus, to said MOS transistor array;

a second bus for inputting the data to be processed, which is inputted from said input bus, to said MOS transistor array;

a bus switching circuit for connecting said input bus to said first bus and second bus or to either said first bus or second bus, responsive to the shifting operation and direction to be applied to said data to be processed;

a first data compensating circuit capable of compensating to make all bits of the data on said first bus "0", or to expand to a same value as a highest bit;

a second data compensating circuit capable of compensating to make all bits of the data on said second bus "0";

a decoder which includes n+1 numbers of control signal line connected to said MOS transistor array, and decodes a signal indicating a shift quantity and a shift direction of the shifting operation to be applied to said data to be processed, to signify one corresponding control signal line among said control signal lines, and to produce a signal indicating compensation of data done by said first data compensating circuit and second data compensating circuit; and an output bus for outputting n-bit data to the outside;

wherein said MOS transistor array is so constructed that,

MOS transistors are arranged in a matrix of n rows X n+1 columns, all bit lines of said first bus and all bit lines of said second bus are connected to sources of the MOS transistors in a step-like fashion, corresponding bit lines of said output bus are commonly connected to the sources of n+1 numbers of MOS transistor in respective lines, and corresponding control signal lines of said decoder are commonly connected to gates of n numbers of MOS transistor in respective columns.

2. A data shifting circuit as set forth in claim 1, wherein said bus switching circuit connects said input bus only to said first bus, said first data compensating circuit inputs data outputted from said input bus intact to said MOS transistor array from said first bus without compensation;

said second data compensating circuit compensates all bits of the data on said second bus to "0", and inputs it to said MOS transistor array, and said MOS transistor array outputs data obtained by left logical shift of said data to be processed to said output bus, by turning ON the MOS transistors in one column, to whose gates a control signal line signified by said decoder is connected.

3. A data shifting circuit as set force in claim 1, wherein said bus switching circuit connects said input bus only to said first bus, said first data compensating circuit inputs data outputted from said input, bus intact to said MOS transistor array from said first bus without compensation, said second data compensating circuit compensates all bits of the data on said second bus to "0", and inputs to said MOS transistor array, and said MOS transistor array outputs data obtained by left arithmetic shift of said data to be processed to said output bus, by turning ON the MOS transistors in one column, to whose gates a control signal line signified by said decoder is connected.

4. A data shifting circuit as set force in claim 1, wherein said bus switching circuit connects said input bus to both said first bus and said second bus, said first data compensating circuit inputs data outputted from said input bus intact to said MOS transistor array from said first bus without compensation, said second data compensating circuit inputs the data outputted from said input bus intact to said MOS transistor array from said second bus without compensation, and said MOS transistor array outputs data obtained by left rotation of said data to be processed to said output bus, by turning ON the MOS transistors in one column, to whose gates a control signal line signified by said decoder is connected.

5. A data shifting circuit as set forth in claim 1, wherein said bus switching circuit connects said input bus only to said second bus, said first data compensating circuit compensates all bits of the data on said first bus to "0", and inputs to said MOS transistor array, said second data compensating circuit inputs data outputted from said input bus intact to said MOS transistor array from said second bus without compensation, and said MOS transistor array outputs data obtained by right logical shift of said data to be processed to said output bus by turning ON the MOS transistors in one column, to whose gates a control signal line signified by said decoder is connected.

6. A data shifting circuit as set forth in claim 1, wherein said bus switching circuit connects said input bus to both said first bus and said second bus, said first data compensating circuit compensates to expand data outputted from said input bus to a same value as the highest bit of said data to input to said MOS transistor array, said second data compensating circuit inputs the data outputted from said input bus intact to said MOS transistor array from said second bus without compensation, and said MOS transistor array outputs data obtained by right arithmetic shift of said data to be processed to said output bus, by turning ON the MOS transistors in one column, to whose gates a control signal line signified by said decoder is connected.

7. A data shift circuit as set forth in claim 1, wherein said bus switching circuit connects said input bus to both said first bus and said second bus, said first data compensating circuit inputs data outputted from said input bus intact to said MOS transistor array from said first bus without compensation, said second data compensating circuit inputs the data outputted from said input bus intact to said MOS transistor array from said second bus without compensation, and said MOS transistor array outputs data obtained by right rotation of said data to be processed to said output bus, by turning ON the MOS transistors in one column, to whose gates a control signal line signified by said decoder is connected.

* * * * *